June 2, 1959  J. H. HUMPHREY ET AL  2,888,849
ELECTRONIC MUSICAL INSTRUMENTS
Filed Sept. 14, 1955  3 Sheets-Sheet 1
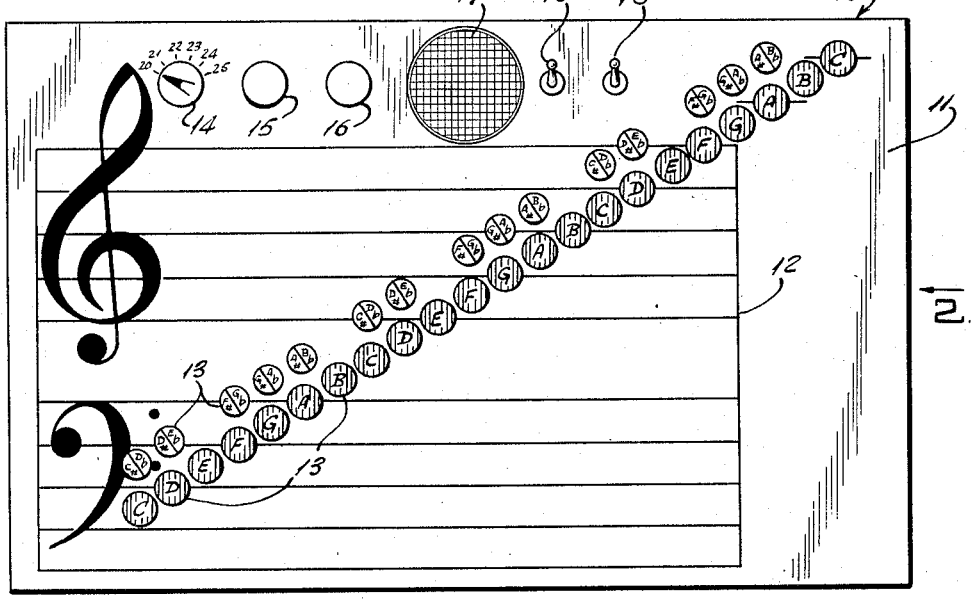
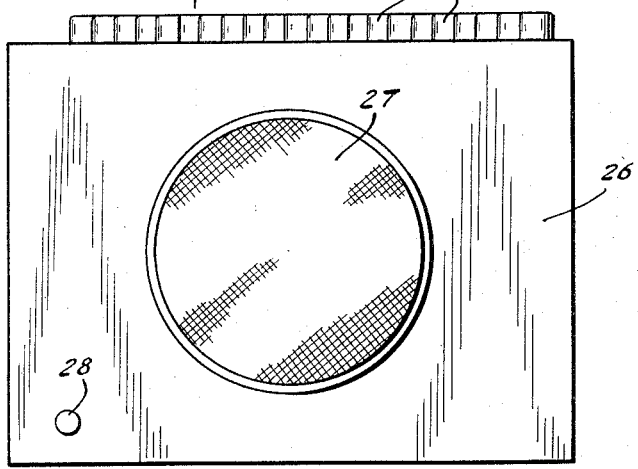
INVENTORS
JOHN H. HUMPHREY
RICHARD H. DORF
BY
ATTORNEY

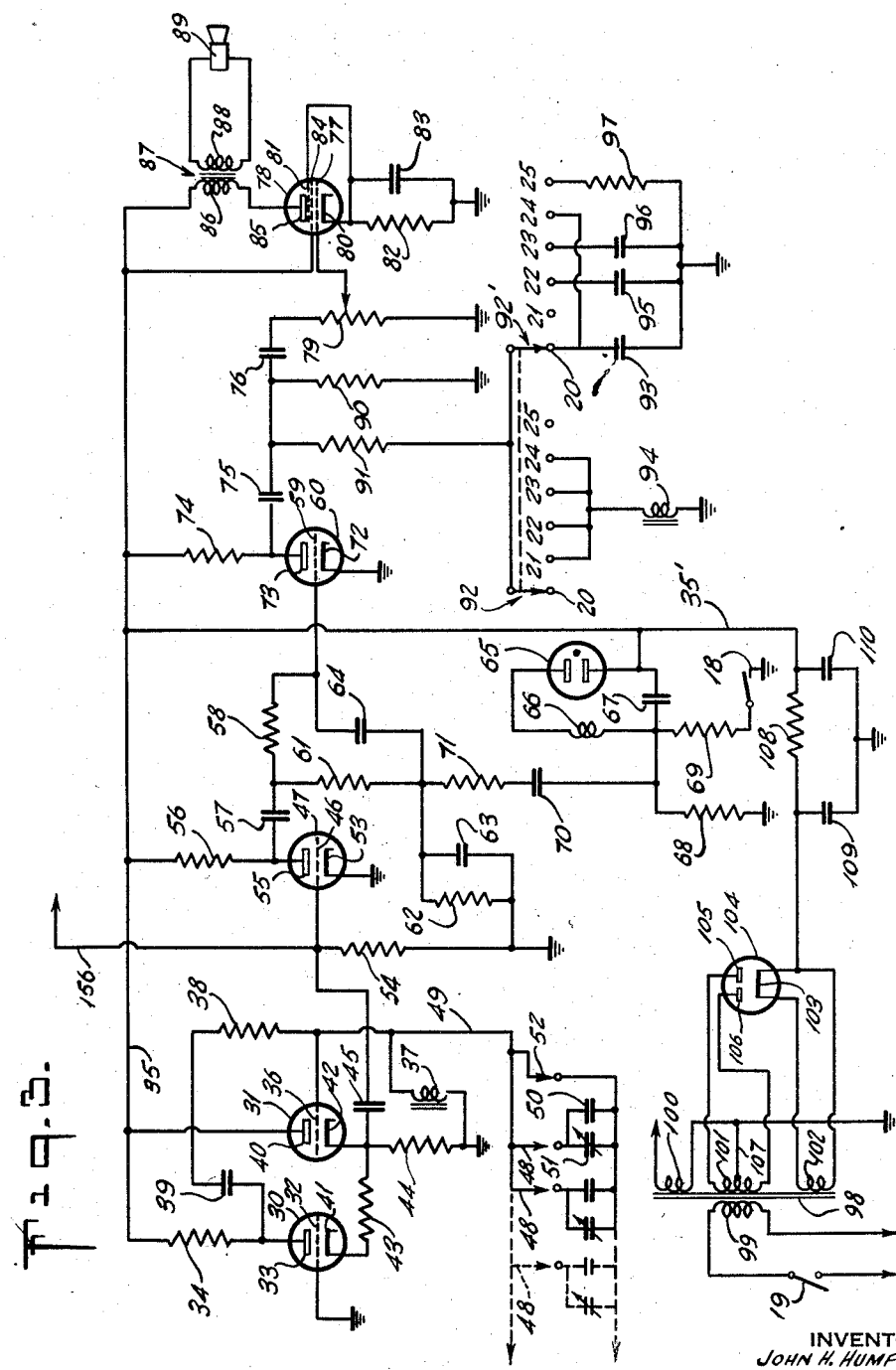

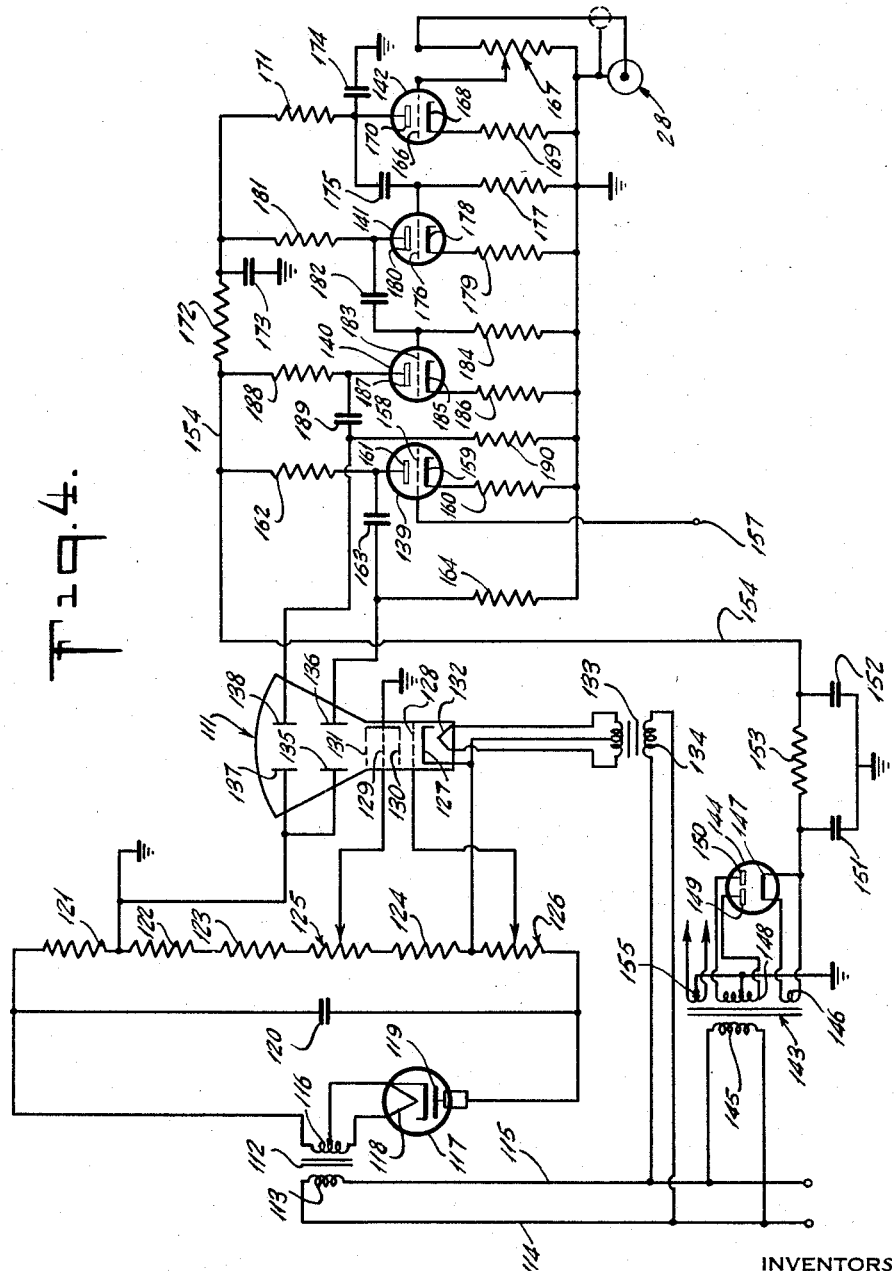

United States Patent Office 2,888,849
Patented June 2, 1959

2,888,849

ELECTRONIC MUSICAL INSTRUMENTS

John H. Humphrey, Port Washington, and Richard H. Dorf, New York, N.Y.; said Dorf assignor to said Humphrey Application September 14, 1955, Serial No. 534,310

7 Claims. (Cl. 84—1.01)

This invention relates to electronic musical instruments and more specifically to such an instrument that is both educational and entertaining and embodies a novel tone generating circuit and method of operation.

One object of the invention resides in the provision of a musical instrument affording a direct comparison of each note of a musical scale with its sound and position on the musical staff.

Another object of the invention is the provision of a novel musical instrument utilizing all electronic components for audibly and visually reproducing tones of the musical scale and for comparing them with tones produced by the human voice and by musical instruments in order to facilitate pitch training and for other purposes.

Still another object of the invention resides in the provision of an improved electronic musical instrument characterized by its simplicity, stability and relatively low cost and that will realistically produce a relatively wide range of tones of the musical scale simulating different instruments including strings, woodwinds and brasses. This is attained through an improved arrangement and cooperation of elements for generating tones and for filtering them to produce the desired harmonic patterns characteristic of the instruments to be simulated.

A further object of the invention resides in the provision of a novel electronic musical instrument that is easily operated and maintained and forms an attractive educational and entertaining device to children as well as adults.

A still further object of the invention is to provide an improved method and circuit for generating musical tones.

The above and other objects and advantages of the invention will become more apparent from the following description and by reference to the accompanying drawings forming part of this application.

In the drawings:

Fig. 1 is a plan view of one form of panel embodying the invention and forming the face of the cabinet;

Fig. 2 is a side elevational view of the invention as viewed from the position 2 in Fig. 1;

Fig. 3 is an electronic circuit for audibly producing musical tones in accordance with the invention; and Fig. 4 is an electronic circuit for visual representation of tones.

While electronic musical instruments are commercially available, known devices involve highly complicated circuits and circuit elements that are costly, require relatively large cabinets or enclosures and are generally controlled by keyboards similar to those used for organs and pianos. The teaching of this invention on the other hand enables the provision of a highly compact, relatively inexpensive device that will produce a wide variety of musical tones. Through an improved arrangement of the control or operating means and the inclusion of a frequency comparator or indicator, the device is useful not only as a constructive and entertaining toy but also as a highly effective educational device for musical training.

Broadly the invention comprises a variable frequency oscillator, an improved shaping circuit for producing the desired harmonics to simulate a musical tone and means for visually comparing the frequency of tones produced by the oscillator with other sounds such as the voice or notes of musical instruments to determine the frequency or pitch of such other sounds. For the operation of the device and to enhance the musical training aspect thereof, the oscillator is provided with readily operable switches, advantageously of the push button type. These are arranged relative to a musical staff imprinted on the operating panel and appropriately lettered so that the pitch of a tone, the identifying letter and the position of the note on the staff can be readily correlated. In addition filter networks are included to provide stops for simulating different instruments.

Referring now to the drawings and more specifically to Figs. 1 and 2 thereof showing the embodiment of the completed device the invention here illustrated has a cabinet 10 generally of rectangular shape which may be made of wood, metal or other suitable material. The top panel 11 which includes various operating controls has a musical staff 12 imprinted thereon and having both the treble and the bass clefs. The keys for producing various tones of the musical scale are here shown as of the push button type with the button portion 13 of each key extending upwardly through the front panel 11 in proper position with respect to the musical staff. The term "push button" as here employed in identifying the keys is intended to be more representative of a note of music than of any particular type of switch mechanism. Actually, the keys may be of the free acting type generally associated with the words "push button." Alternately, however, the switches may have a lever action with a portion forming a part of, or attached to, the lever having the appearance of a push button or a note of music, which idea the term "push button" is here intended to convey. Thus, though in the description to follow the members 13 are referred to as "buttons," that designation of them is not to be construed as limiting from the standpoint of switch structure involved, but is rather to be construed as suggestive of the appearance of a musical note as normally portrayed on a musical score.

Each button 13, when depressed, will produce the tone indicated by its position on the staff. In addition each of the several buttons 13 preferably carry the letters designating the notes and accidentals of the scale so that complete coordination is obtained of the letter designation of each note, its position on the staff and the tone thereof. The basic notes of the scale are illustrated in black while the accidentals are shown in white. For convenience and ease of operation, the accidentals are positioned between their notes and slightly offset therefrom. For example, in the case of the first two notes of the scale, namely, C and D, it will be observed that the accidental is labeled C sharp and D flat and represents a half tone between the notes C and D. The other accidentals are similarly positioned with reference to their basic notes.

In addition to the push-buttons 13, the apparatus further includes a step switch 14 for the selection of different stops for producing tone qualities simulating different instruments, a volume control 15 to control music volume, a voice volume control 16, a frequency comparator or tuning indicator 17, a vibrato switch 18 and at least one power switch 19. The several stops on switch 14 are denoted by the numerals 20 to 25 and will be discussed in connection with the circuit diagrams. In the side view of the apparatus shown in Fig. 2 it will be observed that the side wall 26 includes a loud speaker opening 27 and a jack 28 for the insertion of a microphone to pick up external sounds such as the voice or other musical instruments for the purpose of comparing their frequencies with signals of known frequency produced by this apparatus.

The electronic circuits responsive to the push-buttons 13 and the stop switch 14 to produce musical tones and for comparing a predetermined frequency generated within the unit with an external signal on tuning indicator 17 are shown in Figs. 3 and 4 of the drawings. The circuit shown in Fig. 3 comprehends the tone generating and producing apparatus whereas the circuit shown in Fig. 4 relates to the tuning indicator which includes a small cathode ray tube as the comparator.

The generation of signals of different frequencies as determined by the several push buttons 13 is accomplished by a Wein bridge oscillator having a pair of triode tubes 30 and 31 which may either be separate tubes or constitute a double triode wherein both tubes are enclosed within the same envelope. In this oscillator, the grid 32 of the tube 30 is connected to ground while the plate 33 is connected through a plate resistor 34 to a conductor 35 carrying D.C. voltage obtained from a suitable power supply. The second tube 31 has its grid 36 connected to ground through an inductor 37 and to the plate 33 of tube 30 through the series connected resistor 38 and condenser 39. The plate 40 of the tube 31 is connected directly to the high voltage conductor 35. The cathodes 41 and 42 of tubes 30 and 31 are connected together by a resistor 43 and the cathode 42 is returned to ground through a second cathode resistor 44. It will be observed that oscillation is produced by reason of the cathode coupling between these tubes and the output signal is obtained from the cathode 42 through a coupling condenser 45. This signal is then fed to the grid 46 of the next tube 47.

The signal generated by the oscillator described above is a substantially pure sine wave and as will be shown this sine wave is modified to produce a wave closely approximating a saw tooth wave that includes the fundamental and a plurality of harmonics for simulating musical tones. The frequency of the oscillator is controlled by a plurality of switches 48 actuated by the push buttons 13 of Fig. 1. The switches 48 are normally open and one contact of each switch is connected through a conductor 49 to the grid 36 of tube 31. The other contact of each switch is connected to ground through a fixed condenser 50 and an adjustable condenser 51 connected in parallel therewith. While only three switches 48 are shown in this drawing it is apparent that a switch 48 and its associated condensers 50 and 51 is required for each basic note and accidental to be reproduced by the equipment. In addition to the switches 48 an auxiliary, normally closed switch 52 is connected between the conductor 49 and ground. This switch is opened upon the depression or closure of any one or more of the switches 48 and this action may be accomplished either mechanically whereby a single switch 52 is actuated by each of the push buttons 13 or each switch 48 may include a pair of normally closed contacts that will open upon depression of the switch.

The tube 47 receiving the oscillator signal is connected as a so-called "clipper" and in effect limits the level of the signal produced by the oscillator so that its output signal while having the same frequency as the oscillator signal will closely aproximate square wave in that the peaks of the sine waves will be flat topped. This end is attained by connecting the cathode 53 of the tube 47 to ground to provide substantially zero bias, returning the grid 46 to ground through a resistor 54 and connecting the plate 55 through a very high plate resistance 56 to the high voltage bus 35. When a signal is applied to the grid 46 from the oscillator, as the signal becomes positive the tube 47 will overload very quickly and limit the positive amplitude thereof. Similarly as the input signal to the grid goes negative the plate current quickly drops to zero so that the bottom half of the oscillator signal will also be limited in amplitude.

This clipped sine wave signal which now closely simulates a square wave is fed from the plate 55 of the tube 47 through a condenser 57 and a resistor 58 to the grid 59 of a first amplifier tube 60. The ground return circuit for the grid 59 includes the resistor 58, a resistor 61 and a resistor 62, the latter having a fairly large condenser 63 connected in parallel therewith. In addition a condenser 64 is connected between the grid 59 and the junction of resistors 61 and 62. This circuit constitutes in effect a differentiator that will modify the clipped sine wave signal appearing at the plate 55 of the tube 47 and produce a signal at the grid 59 of tube 60 closely approximating a saw tooth wave useful for producing musical signals. It will be observed that the attainment of a musical tone in this manner provides an inexpensive, stable and efficient method of producing a realistic musical tone and avoids the complex and expensive circuits required to generate and control saw tooth waves directly.

In order to simulate an organ tone it is desirable to provide some modulation of the tone or vibrato that lends fullness to the music and a pleasing departure from continuous tones. This is attained by an oscillator having a neon tube 65 connected in series with an inductor 66 and a condenser 67. The junction between the condenser 67 and the tube 65 is connected to the high voltage bus 35' while the junction of condenser 67 and inductor 66 is connected through a resistor 68 to ground and through a somewhat lower resistor 69 and the vibrato switch 18 to ground. The output signal is obtained from the junction of inductor 66 and a condenser 67 and is fed through a coupling condenser 70 and a series resistor 71 to the junction of resistors 61 and 62 in the circuit of grid 59 of tube 60. When the switch 18 is closed oscillations will be produced in this circuit causing a slight variation in frequency of the signal appearing at the grid 59.

The first amplifier tube 60 has its cathode 72 grounded and the grid 59 is biased negatively by the time constant circuit including resistor 62 and condenser 63. The plate 73 is connected to the high voltage bus 35 through a resistor 74. The amplified output signal appearing at the plate 73 is connected through a pair of coupling condensers 75 and 76 to the grid 77 of the output tube 78. In addition a volume control 79 (operated by knob 15 of Fig. 1) is interposed between the condenser 76, the grid 77 and ground so that the amplitude of the signal impressed on the grid 77 can be modified to provide a controlled volume. The cathode 80 and the suppressor grid 81 of the tube 78 are connected together and to ground through parallel connected bias resistor 82 and a bypass condenser 83. The screen grid 84 is connected directly to the high voltage bus 35 while the plate 85 is connected through the primary 86 of an output transformer 87 to the bus 35. The secondary 88 of the transformer 87 is connected to a loud speaker 89 positioned in the opening 27 of the cabinet side wall 26.

In order to provide means for simulating the tones of different instruments as, for instance, the strings, woodwinds, brasses and the like, suitable spectrum shaping networks are connected in the grid circuit of the tube 78. These shaping networks or stops are operated by switches 92 and 92' preferably in the form of a two-gang step switch and operated by the knob 14. While any suitable forming networks may be employed the illustrated network includes a loading resistor 90 connected from the juncture of condensers 75 and 76 to ground and a somewhat lower value resistor 91 connected from the same junction to the movable contactors of switches 92 and 92' that successively engage cooperating sets of contacts. The switch positions are denoted by the numerals 20 to 25 inclusive. When the arms of switches 92 and 92' are at position 20, a condenser 93 is connected from resistor 91 to ground and the reproduced tones will simulate a flute. In position 21 an inductor 94 is connected from resistor 91 to ground to simulate a string instrument. In position 22 the inductor 94 and a condenser 95 are connected in parallel between the resistor 91 and ground to simulate an oboe. In position 23 the inductor 94 and a condenser 96 are used to simulate the cornet. In position 24 the condenser 93 and inductor 94 are used in parallel to simulate the clarinet, while in the diapason position 25 a resistor 97 is connected between the resistor 91 and ground to provide a full range tone.

The power supply for the circuit described above includes a power transformer 98 having a primary 99 for connection to a suitable A.C. supply through the power switch 19 and three secondaries 100, 101 and 102. The secondary 102 supplies the power for the filament 103 of the rectifier tube 104 while the winding 101 is a high voltage winding with the outer terminals thereof connected to the plates 105 and 106 of the tube 104. The center tap 107 of winding 101 is connected to ground and high voltage is obtained from one side of the filament 103. This voltage is fed through a filter including a resistor 108 and condensers 109 and 110 between each side of the resistor and ground. The junction between the resistor 108 and condenser 110 is connected to the bus 35' and thence to the bus 35 for the distribution of the high voltage. Heating current for the filaments of the several tubes 30, 31, 47, 60 and 78 is provided by the winding 100, one side of which may be connected to ground as illustrated.

The circuit for the tuning indicator 17 is shown in Fig. 4 and includes a cathode ray tube 111 as the display device though it is apparent that any other suitable displaying means, productive of similar result in different manners, may be employed.

The power supply for the tube 111 includes a high voltage transformer 112 having a primary 113 adapted to be connected by means of the leads 114 and 115 in parallel with a primary 99 of the transformer 98 as shown in Fig. 3. In this way the switch 19 in that figure will control the application of energy to the transformer 112 though a separate switch may be used if desired. The voltage across the secondary 116 is rectified by a half wave rectifier tube 117 having its filament 118 connected across a portion of the secondary 116. The rectified voltage which appears between one terminal of the secondary winding 116 and the plate 119 is applied across a condenser 120 and a voltage divider consisting of fixed resistors 121, 122, 123, 124 and potentiometers 125 and 126. In this particular embodiment of the invention a ground is connected to the junction of resistors 121 and 122 to provide a slightly reduced voltage on the cathode ray tube 111. The cathode 127 of the tube 111 is connected to the junction of the resistor 124 and the potentiometer 126. The grid 128 is supplied with a negative voltage from the potentiometer 126 while the element 129 is supplied with a positive voltage from the potentiometer 125. The elements 130 and 131 are connected to ground and the filament 132 is heated by a transformer 133 having its primary 134 connected to the conductors 114 and 115.

The illustrated tube 111 is of the electrostatic deflection type having a pair of horizontal deflecting plates 135 and 136 and a pair of vertical deflecting plates 137 and 138. The deflecting plates 135 and 137 are connected to ground and the signals to be reproduced on the cathode ray tube are connected to the plates 136 and 138. The amplifier portion of this indicating device which includes the tubes 139, 140, 141 and 142 are supplied with power by a transformer 143 and a full wave rectifier 144. The transformer 143 has a primary winding 145 connected across the conductors 114 and 115, a secondary winding 146 for heating the filament 147 of the tube 144 and a high voltage winding 148 having its outer terminals connected to the plates 149 and 150 of the tube 144. The center tap of the winding 148 is connected to ground. With this arrangement a positive voltage will appear between the ground and cathode 147 and this voltage is filtered by a pair of condensers 151 and 152 and a resistor 153. The filtered high voltage appearing at the junction of the resistor 153 and the condenser 152 is applied to the amplifying tubes through a conductor or bus 154. The filament voltage for the tubes 139 through 142 is supplied by the transformer secondary winding 155.

The signal to be applied between the horizontal plates 135 and 136 of the tube 111 is obtained from the grid 46 of the tube 47 shown in Fig. 3 by means of the conductor 156 connected with the terminal 157 of Fig. 4 and which in turn is connected directly to the grid 158 of tube 139. The cathode 159 of this tube is connected to ground through a cathode resistor 160 and the plate 161 is connected to the conductor 154 through a plate resistor 162. The output signal from the tube 139 is fed through a condenser 163 to the plate 136 of tube 111. In order to provide a high impedance ground return path for the plate 136 a relatively high value resistor 164 is connected therebetween. With this arrangement any signal generated by the oscillator tubes 30 and 31 of Fig. 3 will appear as an illuminated line on the face of the cathode ray tube 111 and will be observed on the screen 17 as shown in Fig. 1.

To compare an external signal with this oscillator signal in order to determine their relative frequencies and thus precise frequency of the external signal, a suitable microphone is connected with a jack 28 so that a microphone signal is applied between ground and the grid 166 of tube 142 through a potentiometer 167. Potentiometer 167 is termed the voice volume control and is operated by knob 16 of Fig. 1. The cathode 168 of tube 142 is connected to ground through resistor 169 while the plate 170 is connected to the conductor 154 through a plate resistor 171 and an RC filter comprising resistor 172 and condenser 173. The plate 170 of tube 142 is bypassed to ground through a small condenser 174 and the signal on the plate is fed through a condenser 175 to the grid 176 of tube 141. The grid 176 is returned to ground through a resistor 177 and cathode 178 is connected to ground through a resistor 179. The plate 180 of tube 141 is supplied with voltage from the RC filter 172—173 through a plate load resistor 181. The amplified signal appearing at plate 180 is then fed through a coupling condenser 182 to the grid 183 of tube 140 which is returned to ground through a resistor 184. The cathode 185 of tube 140 is returned to ground through a cathode resistor 186 and the plate 187 is connected to the high voltage conductor 154 to the resistor 188. The output signal in tube 140 is then applied through the condenser 189 to the plate 138 of the tube 111. This plate is also grounded through a relatively high value resistor 190 to prevent the accumulation of a positive charge thereon.

It is apparent from the foregoing description of this invention that it not only provides an educational toy but also a frequency determining device in order to aid students of music, and particularly voice, to check their accuracy in the reproduction of musical tones. As an educational toy melodies can be produced easily by the successive depression of buttons 13 representing the whole and half notes of one or more octaves of the musical scale. In addition the reproduced tones may be modified by placing the vibrato switch 18 in the "on" position in order to slightly modulate the frequencies of the tones produced and thus closely simulate an organ tone. In addition other variations can be obtained by the selection of stops 20 to 25 representing the various instruments.

In order to check the frequency of a tone produced by voice or another musical instrument, a microphone is merely connected to the jack 28 whereupon the signal is amplified by the tubes 140 to 141 and applied to the cathode ray tube 111. Simultaneously, a signal is applied from the oscillator portion of the circuit shown in Fig. 3 so that a Lissajous figure or wave form is produced on the screen 17. By sounding an external note and then successively pushing buttons 13 until the pattern on the screen appears as either a straight line, an oval or a circle the sounded frequency will then be equal to the frequency of the particular button 13 that has been depressed. In this way quite an accurate frequency determination can be made. When making frequency tests of this character it may be desirable in certain instances to provide an auxiliary switch to cut off the loud speaker 39 in order to prevent interference with the microphone and to test the ability of an individual to reproduce a given tone.

Another important aspect of this apparatus is the improved method arrangement of elements for attaining a musical tone through the utilization of a sine wave generator producing a conventional sine wave, clipping the wave to produce a flat top signal resembling a square wave and then differentiating the square wave to simulate a saw tooth wave for use in a formant system to produce musical tones.

The embodiment of the invention illustrated and described includes the cathode ray tube 111 and associated apparatus within the cabinet 10 as shown in Fig. 1 with the face of the cathode ray tube being viewed through the opening 17 in the front panel. If desired, however, this cathode ray tube together with its associated equipment generally as illustrated in Fig. 4 of the drawings may be contained within a separate housing and coupled with the musical tone generating apparatus as shown in Fig. 3 by suitable electrical cables and plug-in connectors.

While only one embodiment of the invention has been shown and described, it is apparent that modifications, changes and alterations may be made without departing from the true scope and spirit thereof.

Having described our invention, what we claim as new and desire to secure by Letters Patent is:

1. A musical instrument comprising a panel having the musical staff applied thereto, a plurality of manually operated keys each representing a note of the musical scale and positioned in proper musical relation with respect to said staff, means operated by said keys for generating different musical tones in response to the actuation of said keys, means connected with said musical tone generating means for audibly reproducing said tones and means connected with said reproducing means including a plurality of stops for modifying the frequency characteristics of the reproduced tones to simulate different instruments.

2. A musical instrument and training device comprising a panel having the musical staff applied thereto, a plurality of keys representing the notes of a musical scale and arranged relative to said staff to simulate notes located thereon, means connected with said keys and including a signal generator and signal modifying means for generating different musical tones, a loud speaker for audibly reproducing said tones, a visual frequency comparator, and means connected to said comparator for applying a signal corresponding to an unknown musical tone and for applying a known frequency from said signal generator to said comparator to determine the frequency of said unknown tone.

3. A musical instrument according to claim 2 wherein the first said means includes a plurality of stops for modifying the frequency characteristics of the reproduced tones.

4. A musical instrument according to claim 2 wherein the first said means includes an oscillator for frequency modulating said tones to simulate vibrato.

5. A musical instrument according to claim 2 wherein said signal generator produces a sine wave in response to the actuation of a key and at a frequency substantially equal to the fundamental of the musical tone represented by said key and said signal modifying means includes a clipper for limiting the amplitude of said sine wave to produce a simulated square wave and differentiating means connected with said clipper for transforming said square wave into a simulated saw tooth wave having musical qualities.

6. A musical training device for showing the position of a musical note to be identified with respect to the notes of a musical scale which comprises, a panel displaying the musical staff, electrical means operable in conjunction with said staff providing visual representation of the frequencies of the various notes on said staff, means for picking up the musical note to be identified, means connected with said pick up means for translating said note to be identified into electrical frequency and means connected with said translating means for visually representing said frequency of said note to be identified on said visual representation providing means in conjunction with the representation of the frequency of the closest note thereto on said musical staff.

7. A musical training device for showing the position of a musical note to be identified with respect to the notes of a musical scale which comprises, an element displaying the musical staff, means positioned with respect to said staff to depict the notes of a musical scale, electrical means operable in conjunction with said notes providing visual representation of the tones thereof, electrical means for picking up a musical note of unknown frequency to be identified, means connected with said pick up means for translating said note to be identified into electrical frequency and means connected with said translating means for visually representing said frequency of said note to be identified in conjunction with the representation of the closest note thereto on said staff.

References Cited in the file of this patent

UNITED STATES PATENTS

| | | |
|---|---|---|
| 1,392,766 | Huth | Oct. 4, 1921 |
| 2,153,800 | Holmes | Apr. 11, 1939 |
| 2,207,450 | Bergan et al. | July 9, 1940 |
| 2,441,964 | Grieg | Mar. 25, 1948 |
| 2,441,983 | Young | May 25, 1949 |
| 2,563,477 | Martin | Aug. 7, 1951 |
| 2,570,442 | Grosdoff | Oct. 9, 1951 |
| 2,791,147 | Meadows | May 7, 1957 |